(12) United States Patent
Pepere et al.

(10) Patent No.: US 10,902,484 B1
(45) Date of Patent: Jan. 26, 2021

(54) SYSTEM AND METHOD FOR CARBON FOOTPRINT DETERMINATION

(71) Applicant: Morgan Stanley Services Group Inc., New York, NY (US)

(72) Inventors: Merav Pepere, Brooklyn, NY (US); Kranthi Darapu, Jersey City, NJ (US); Nandhini Viruthagiri, Weehawken, NJ (US); Shinyou Hwang, Sunnyside, NY (US)

(73) Assignee: MORGAN STANLEY SERVICES GROUP INC., New York, NY (US)

(*) Notice: Subject to any disclaimer, the term of this patent is extended or adjusted under 35 U.S.C. 154(b) by 0 days.

(21) Appl. No.: 16/920,481

(22) Filed: Jul. 3, 2020

(51) Int. Cl.
*G06Q 20/08* (2012.01)
*G06Q 30/02* (2012.01)
*G06Q 20/10* (2012.01)
*G06Q 20/14* (2012.01)

(52) U.S. Cl.
CPC ....... *G06Q 30/0283* (2013.01); *G06Q 20/102* (2013.01); *G06Q 20/145* (2013.01)

(58) Field of Classification Search
CPC ............. G06Q 20/201; G06Q 30/0206; G06Q 30/0283; G06Q 40/12; Y02P 90/90; Y02P 90/95
See application file for complete search history.

(56) References Cited

U.S. PATENT DOCUMENTS

| | | | |
|---|---|---|---|
| 10,789,600 B1* | 9/2020 | Lee | G06Q 20/401 |
| 2005/0283428 A1 | 12/2005 | Bartels et al. | |
| 2006/0089851 A1* | 4/2006 | Silby | G06Q 99/00 705/500 |
| 2006/0095356 A1* | 5/2006 | Koornstra | G06Q 40/00 705/35 |
| 2007/0233616 A1* | 10/2007 | Richards | G06Q 30/0283 705/400 |

(Continued)

OTHER PUBLICATIONS

Asik, et al., Policy Enforcement upon Software Based on Microservice Architecture, IEEE, SERA, Jun. 2017 (Year: 2017).*

(Continued)

*Primary Examiner* — Daniel Vetter
(74) *Attorney, Agent, or Firm* — Pearl Cohen Zedek Latzer Baratz LLP (57) ABSTRACT

A system and method may determine or display the carbon emissions impact for transactions, by for example receiving from transaction data sources data items describing transactions, each transaction associated with a user, a merchant, and an amount; for each transaction receiving or creating carbon emissions impact data for the merchant associated with the transaction; and deriving from the amount associated with the transaction and the carbon emissions impact data for the merchant associated with the transaction a carbon emission value associated with the transaction. Each data item may include a transaction amount and a merchant identifier, and/or other information. Calculating carbon emissions for the transaction may include multiplying the currency amount associated with the transaction and the carbon emissions impact data for the merchant associated with the transaction and dividing the result by the annual revenue for the merchant. The carbon emissions value may be displayed to a user.

12 Claims, 7 Drawing Sheets

(56) References Cited

U.S. PATENT DOCUMENTS

| | | | |
|---|---|---|---|
| 2010/0042453 A1* | 2/2010 | Scaramellino | G06Q 10/06 705/308 |
| 2011/0060614 A1 | 3/2011 | Clark et al. | |
| 2011/0071867 A1* | 3/2011 | Chen | G06Q 10/06 705/7.37 |
| 2011/0119112 A1* | 5/2011 | Waibel | G06Q 10/00 705/7.36 |
| 2011/0208621 A1 | 8/2011 | Feierstein et al. | |
| 2011/0213690 A1* | 9/2011 | Ghosh | G06Q 40/04 705/37 |
| 2012/0323619 A1 | 12/2012 | Risz et al. | |
| 2013/0338936 A1 | 12/2013 | Hana et al. | |
| 2014/0012553 A1* | 1/2014 | Kelly | G06Q 10/063 703/6 |
| 2016/0117774 A1* | 4/2016 | Bateman | G06Q 40/06 705/36 R |
| 2017/0103325 A1* | 4/2017 | Meinrenken | G06N 5/02 |
| 2018/0060204 A1 | 3/2018 | Jin et al. | |
| 2018/0182044 A1* | 6/2018 | Iannace | G06Q 40/12 |
| 2019/0026750 A1* | 1/2019 | Abdelsamie | G06Q 30/018 |
| 2019/0066217 A1 | 2/2019 | Stoner, Jr. et al. | |
| 2019/0213097 A1 | 7/2019 | Jin et al. | |
| 2019/0370708 A1 | 12/2019 | Shih et al. | |
| 2020/0320494 A1* | 10/2020 | Chepe | G06Q 20/108 |

OTHER PUBLICATIONS

West, et al., Evaluating the Use of a Carbon Footprint Calculator: Communicating Impacts of Consumption at Household Level and Exploring Mitigation Options, Journal of Industrial Ecology, vol. 20, No. 3, 2015, pp. 396-409 (Year: 2015).*

Peters, This credit card won't let you buy anything else after you've hit your annual carbon limit, fastcompany.com, May 2019 (Year: 2019).*

Edmond, This credit card has a carbon-emission spending limit, World Economic Forum, May 2019 (Year: 2019).*

Steven, Ben, "This app will automatically tell you the carbon footprint of your shopping", Nov. 21, 2019, 5 pgs, https://www.chargedretail.co.uk/2019/11/21/this-app-will-automatically-tell-you-the-carbon-footprint-of-your-shopping/.

Pohjanpalo, Kati, Finland has an app to calculate carbon footprint based on user's purchases, Nov. 21, 2019, 4 pgs, https://www.business-standard.com/article/current-affairs/finland-has-an-app-to-calculate-carbon-footprint-based-on-user-s-purchases-119112100549_1.html.

"The Partnership for Carbon Accounting Financials (PCAF), has outlined principles and goals for measuring and controlling financed emissions." Sep. 24, 2020.

AR6 Synthesis Report: Climate Change 2022, https://www.ipcc.ch/report/sixthassessment-reportcycle/, Oct. 2020.

Recommendations of the Task Force on Climate-related Financial Disclosures, Jun. 2017.

Enhancing banks' and insurers' approaches to managing the financial risks from climate change, Bank of England, Apr. 15, 2019 https://www.bankofengland.co.uk/prudentialregulation/publication/2019/enhancing-banks-and-insurers-approaches-to-managing-thefinancialrisks-from-climate-change-ss.

Greenhouse Gas Protocol, World Resources Institute, https://ghgprotocol.org/sites/default/files/standards_supporting/FAQ.pdf.

PACF, "PACF Carbon Accounting," 2020.

The Global Industry Classification Standard (GICS) is an industry taxonomy developed in 1999 by MSCI and S&P for use by the global financial community. The GICS structure consists of 4 levels, i.e. sector, industry group, industry, and sub-industries. For more details, see: https://www.spglobal.com/marketintelligence/en/documents/112727.gicsmapbook_2018_v3_letter_digitalspreads.pdf.

Wikipedia, "Wikipedia," [Online]. Available: https://en.wikipedia.org/wiki/List_of_countries_by_carbon_dioxide_emissions. [Accessed Oct. 1, 2020].Original source: Fossil CO2 emissions of all world countries.

* cited by examiner

| Company | GICS Sector Name | GICS Industry Group Name | GICS Industry Name | GICS Sub Industry Name | Sum of carbon-Scope 1,2,3 (tonne KgCO2e) | Revenue (USD mn) | Carbon value (tonne Kg CO2e/ USD mn) | Carbon Value per dollar (KgCO2e / USD) |
|---|---|---|---|---|---|---|---|---|
| Entertainment Corporation | Consumer Discretionary | Consumer Services | Hotels, Restaurants & Leisure | Casinos & Gaming | 15112960.79 | 4623 | 3269.08 | 3.27 |
| Resorts, Limited | Consumer Discretionary | Consumer Services | Hotels, Restaurants & Leisure | Casinos & Gaming | 34475354.37 | 8569 | 4023.26 | 4.02 |
| Gaming Corporation | Consumer Discretionary | Consumer Services | Hotels, Restaurants & Leisure | Casinos & Gaming | 956875.00 | 165 | 5799.24 | 5.80 |
| Star Hotels Worldwide LLC | Consumer Discretionary | Consumer Services | Hotels, Restaurants & Leisure | Hotels, Resorts & Cruise Lines | 45283272.99 | 4562 | 9926.19 | 9.93 |
| Asia International Limited | Consumer Discretionary | Consumer Services | Hotels, Restaurants & Leisure | Hotels, Resorts & Cruise Lines | 5689565.00 | 590 | 9643.33 | 9.64 |
| Hotel International, Inc. | Consumer Discretionary | Consumer Services | Hotels, Restaurants & Leisure | Hotels, Resorts & Cruise Lines | 85796593.51 | 8565 | 10017.12 | 10.02 |
| Pan Asia Limited | Consumer Discretionary | Consumer Services | Hotels, Restaurants & Leisure | Hotels, Resorts & Cruise Lines | 8657854.00 | 756 | 11452.19 | 11.45 |
| Fast Food Shack Inc. | Consumer Discretionary | Consumer Services | Hotels, Restaurants & Leisure | Restaurants | 6340009.50 | 806 | 7866.02 | 7.87 |

SYSTEM AND METHOD FOR CARBON FOOTPRINT DETERMINATION

FIELD OF THE INVENTION

The present invention relates generally to providing a determination of a "carbon footprint" (e.g. amount of carbon dioxide or other greenhouse gas e-missions) based on a user's activity.

BACKGROUND OF THE INVENTION

Computer systems and technologies exist to determine carbon emission indices of for example companies, and the "carbon impact" or "carbon footprint", e.g. the total greenhouse gas (GHG, e.g. carbon dioxide and methane) emissions caused the companies, including for example emissions involving manufacture, transport, use, disposal, etc. of products and services. Carbon impact may be expressed for example as carbon dioxide equivalent, but may capture greenhouse effects from gasses other than carbon dioxide.

For example different merchants or service providers may have carbon emissions or footprint data relevant to the organization's operations or sales calculated and provided by a service, such as the S&P Trucost data service described at https://www.trucost.com/, providing data which may be licensed.

SUMMARY OF THE INVENTION

A system and method may determine or display the carbon emissions impact for a specific user's transactions, by for example receiving data items from transaction data sources (e.g. computer systems operated by companies tracking or effecting the transactions), each data item describing a transaction, each transaction associated with the user, a merchant, and a currency amount; for each transaction receiving or creating carbon emissions impact data for the merchant associated with the transaction; and deriving from the currency amount associated with the transaction and the carbon emissions impact data for the merchant associated with the transaction a carbon emission value associated with the transaction. Each data item may include for example a transaction amount and a merchant identifier, and/or other information. Calculating or deriving a carbon emission value associated with the transaction may include multiplying the currency amount associated with the transaction and the carbon emissions impact data for the merchant associated with the transaction and dividing the result by the annual revenue for the merchant. The carbon emissions value may be displayed to or provided to a user for example in conjunction with or at the same time as transaction information.

An embodiment may display to a user a carbon emissions value related to multiple transactions associated with the user and a carbon emissions value related to multiple transactions associated with other users sharing a characteristic (e.g. a demographic characteristic) with the user. An embodiment may receive from a user a goal defining a percentage of a user's carbon emissions value(s) associated with multiple transactions and display to the user a carbon emissions value left to spend for transactions for a period of time.

A system and method may improve prior carbon footprint calculation technology and financial analysis technology, and may provide a technology solution which may for example be integrated with a banking service, financial service, or other service, that may help an average consumer or user understand the carbon impact they are causing by their daily transactions. The service may source the consumers' financial transactions across their bank accounts and calculate the carbon footprint for each transaction based on the merchants. Various data sources (e.g. data sources that may be external to an embodiment of the invention) may be leveraged or accessed to receive or to have provided carbon emission details (e.g. preexisting carbon data for merchants). An embodiment may map each transaction to a carbon emission category to provide a carbon emission value.

Embodiments may provide output to a user describing the carbon footprint of each user transaction or purchase and the user's overall (e.g. per period) carbon footprint for the user. Embodiments may allow the user to set carbon emission goals and track the carbon impact of spending, allow the user to cap the amount of carbon emissions of the user, and compare the carbon emissions of the user with that of other users. Embodiments may provide information to users to raise the awareness of the users of their carbon footprints, to allow the users to efficiently reduce their carbon footprint day by day.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
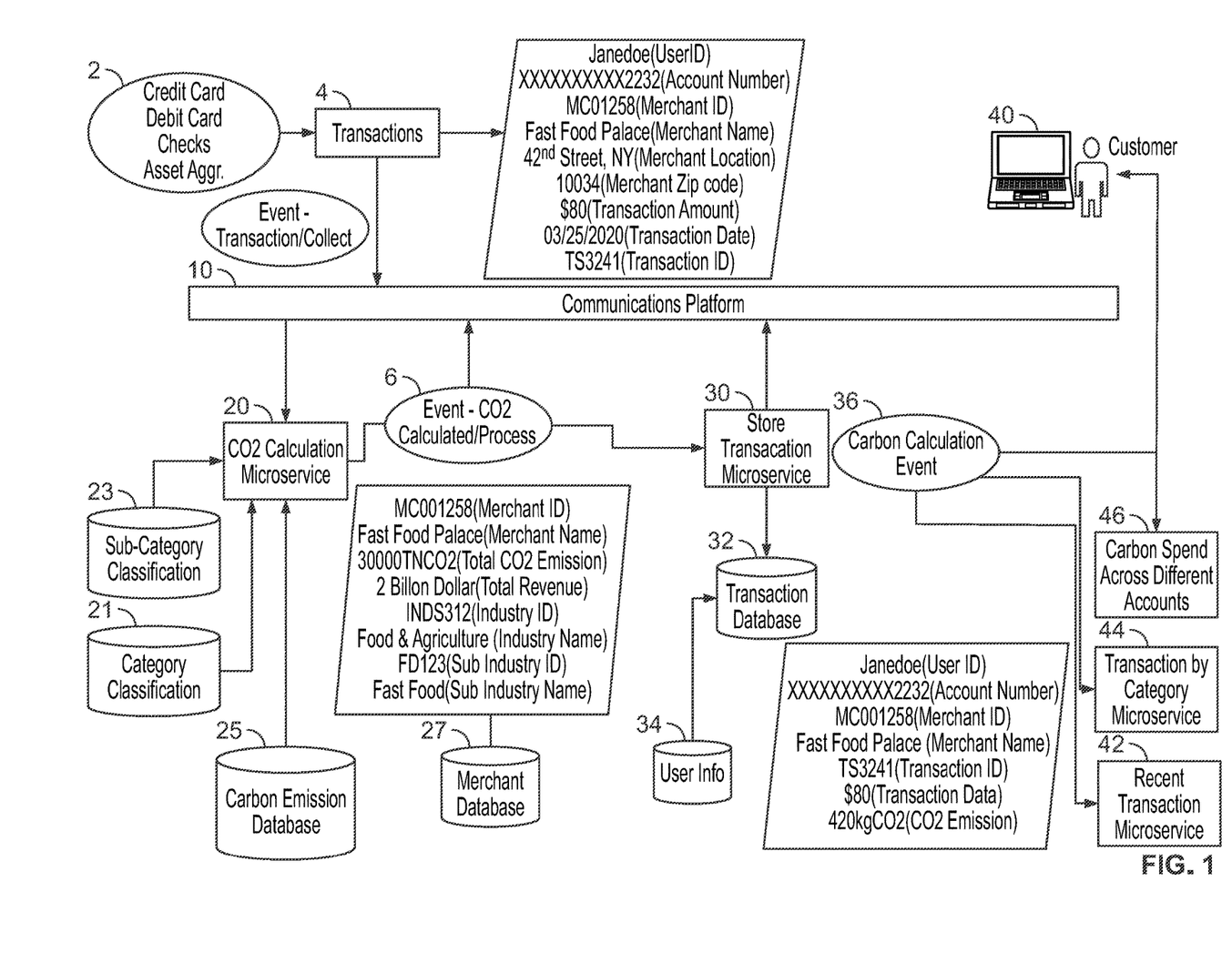
FIG. 1 depicts a carbon footprint tracking and calculation system according to embodiments of the present invention.
Figure 7:
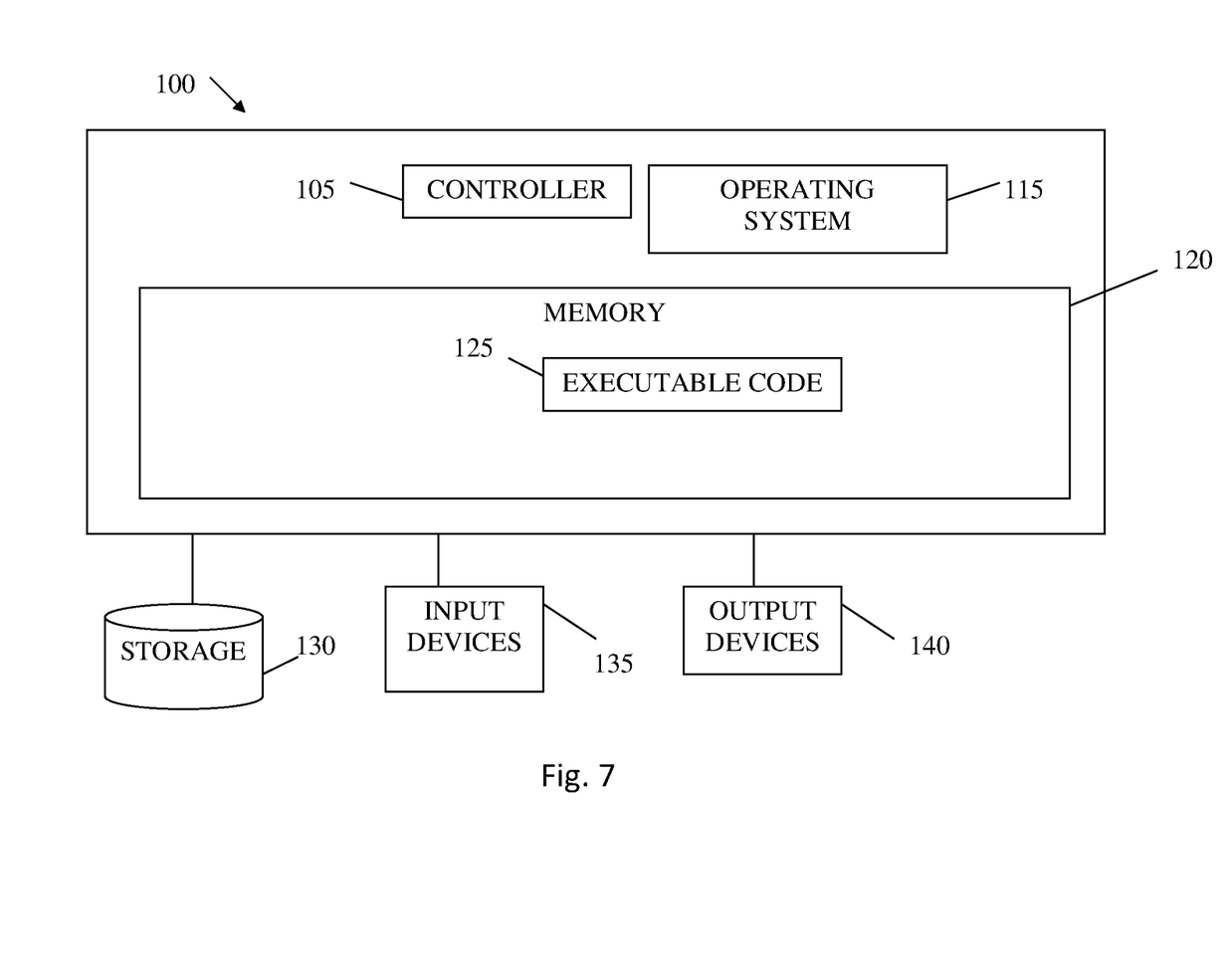
FIG. 7 shows a high-level block diagram of an exemplary computing device according to some embodiments of the present invention.

FIG. 1 depicts a carbon footprint tracking and calculation system according to embodiments of the present invention. Some of the various components of FIG. 1 may be separate computing devices such as servers and others may be combined into one computing device. Some modules in FIG. 1 may be included in other computing devices than as shown. The various computing devices and modules in FIG. 1 may be implemented as computer systems such as shown in FIG. 7.

Transactions or transactions data 4 may be received from computerized transaction data sources data such payment institutions 2, e.g. computer systems operated by banks, financial institutions, credit or debit card companies, mortgage services, rental payment services, and/or internet payment services, etc. Transactions 4 may be data items that include data in various suitable formats describing users' transactions and spending, e.g. credit card payments, checks, debit card payments, wire transfers, transfers to or from bank accounts, mortgage payments, direct transfers to vendors, etc. Embodiments may perform asset aggregation, combining payment, purchase and financial activity from multiple computer systems each operated by a different payment institution 2, and within each institution 2. across multiple accounts for a certain user. Each transaction 4 may be associated with or to a certain merchant (typically separate from a payment institution 2, which handles the transaction between the user or customer on one hand and the merchant on the other). A merchant may be a provider of services or goods to a user, such as a company, manufacturer, store, commodity provider (e.g. gas station), supermarket, retailer, etc. Each transaction 4 may be associated with and thus may include data describing the customer or user, a merchant, an amount, currency (e.g. dollar, Euro, etc.) and/or other information. When discussed herein a transaction may refer both to the real-world event of a transaction, and the data item describing the transaction.

Transaction data and other data may be received or communicated by a messaging or data communications platform 10 such as the Apache Kafka open-source stream-processing software platform. Each transaction data item 4 may be associated, e.g. by a name or code, with a specific merchant described in merchant database 27. Communications platform 10 may transmit data such as transactions 4 among the various entities of the example system; such data may be handled and passed as events as is known in the art. Data collected for each transaction 4 and included in each transaction 4 may include, for example, the financial institution handling the transaction (e.g. passing funds between the merchant and customer), transaction amount (e.g. an amount of funds), the merchant name or identifier, the date of the transaction, and/or possibly other information.

A carbon footprint calculation microservice module 20, e.g. a carbon emission calculator, may take input from various sources and calculate a carbon footprint for a consumer, e.g. for a particular transaction and/or for a group of transactions or over a period of time. Carbon footprint calculation microservice module 20 may calculate values such as carbon spend by transaction, carbon spend by user by financial institution, carbon spend by user accounts across asset aggregated accounts, carbon spend by household, or other values. Input to carbon footprint module 20 may include transaction items such as transactions 4 (e.g. via communications platform 10), and carbon emissions impact data for the merchant associated with the transaction, and information from databases such as category classifications 21, sub-category classifications 23, carbon emission database 25, storing or receiving carbon emissions data relevant to specific merchants (e.g. merchants' yearly emissions per scope 1, 2 and 3, and carbon emissions information derived for merchants not having carbon emissions data available), and merchant database 27. Category classifications 21 and sub-category classifications 23 may include Global Industry Classification Standard (GICS) information.

Module 20 may receive, create, or have created carbon emissions impact data for the relevant merchants. For each incoming transaction 4, carbon footprint module 20 may receive carbon emissions impact data for the merchant associated with the transaction, and may post or send an event to communications platform 10 including details regarding the relevant transaction 4 along with carbon footprint data 6 for the relevant transaction, typically relevant to a particular user or consumer. Carbon footprint calculation microservice module 20 may derive from the currency amount associated with the transaction and the carbon emissions impact data for or associated with the merchant associated with the transaction a carbon emission value associated with the transaction. For example, carbon footprint calculation microservice module 20 may calculate the carbon emission value for each of the financial transactions made by a user in part based on the merchant of the transaction, from which a carbon value may be calculated for the dollar spent by the customer based on various data parameters. When discussed herein, a microservice may be a module or process executed on a processor, or a computer or server performing a certain function.

Databases such as category classifications 21, sub-category classifications 23, carbon emission database 25, and merchant database 27 may be used to enrich, augment or add to data in transactions 4, adding to the transaction data for example GICS information, a Merchant Category Code (MCC) associated with or describing each transaction. In one embodiment, carbon emissions for a transaction are calculated not based on the actual product or service purchased, but rather based on the currency amount of the transaction used as a proportion of the merchant's carbon output. The MCC may be considered a category code describing the transaction.

Transactions 4 along with carbon footprint data 6 may be received by a store transaction microservice 30. Transaction microservice 30 may augment or add to incoming data, and save or insert augmented or enriched transactions 4 to transaction database 32 (mapping corresponding fields of transactions 4 to database 32 if needed). Transaction microservice 30 may add an acknowledged event into data communications platform 10 signaling that the relevant transaction is now stored in the transaction database 32.

A transaction 4 may include for example a user account number, user identification (ID) and/or name, a merchant ID and/or name and/or address or zip or postal code, a transaction amount (e.g. in a certain currency), a transaction date, and a transaction ID. Other or different information may be used.

Within transaction database 32, each item of transaction information 4 may be linked or associated with carbon footprint data 6 relevant to the particular transaction. User information database 34 may describe account, contact and other details for a particular user or accountholder. User information database 34 may be connected to transaction database 32 with for example a key being a user ID or Account number. User information database 34 may be used to provide information to a social comparison engine and goal setting engine. Store transaction microservice 30 may, using user information database 34, post or send carbon calculation events 36 including, e.g. information describing the user or consumer, transaction, and carbon footprint rating, to communications platform 10. An example carbon calculation event 36 may include for example a customer or user ID or name, a merchant ID or name, a transaction ID (e.g. corresponding to or being the same as a corresponding ID in the transaction 4 that resulted in the event 36), a transaction amount (e.g. in a currency), a transaction date, and a CO2 emission amount, (for example in kilograms, tons, pounds, or another suitable weight).

Posting of the message to communications platform 10 may automatically trigger other relevant microservices which are looking for those events to process the messages. Each event 36 may include information describing the user or account holder, the transaction, and the carbon footprint associated with that transaction.

Carbon calculation events 36 may be sent, e.g. via communications platform 10 to a user to view via, e.g. displayed via a user terminal 40, and/or to other services such as a recent transaction microservice 42, transaction by category microservice 44, and/or carbon spend across different accounts microservice 46. A user or customer may access user terminal 40 to view carbon footprint information associated with transactions or spending, via a user interface.

Carbon footprint calculation microservice module 20 may calculate the carbon footprint value for each of the financial transactions 4 made by a certain user. The calculation may be based at least in part on the merchant of the transaction: e.g. based on data describing the merchant, a carbon value is calculated for the dollar spent on the merchant for that transaction.

Carbon footprint calculation microservice module 20 may use available information for the specific merchant relevant to the transaction (e.g. the S&P Trucost data described at https://www.trucost.com/, providing data which typically is licensed, or another service or rating system); and if information is not available for that particular merchant, the merchant may be assigned to a category and have its carbon data derived from the category and known carbon data for that category.

Merchant database 27 may include information describing for each merchant or entity information regarding total carbon emissions for that merchant, e.g. measured on a per-dollar cost per transaction, and/or financial information used to derive such information, such as total revenue and carbon cost per dollar for the merchant. Merchant database 27 may include or use business entity matching functionality, matching a merchant or company name to the relevant carbon footprint databases.

The system of FIG. 1 may use an event driven architecture, where the services and calculations are triggered based on action, but other architectures, not event driven, may be used. For example, when a transaction occurs or is received, it triggers a transaction service that gathers and enriches the data. This data may be then written on a data communications platform 10 such as a Kafka bus, or another communications or event driven platform. A CO2 calculation microservice (e.g. carbon footprint calculation microservice module 20) may listen to data communications platform 10 and may be triggered to action when a new transaction occurs. The transaction may be enriched or have data added to it for example by classifying the data into its category and sub category and executing Carbon Emission logic to determine the carbon emission value for the transaction. The enriched data may be pushed into the data communications platform 10, where it may be read by a store transaction microservice 30 which may log it or store it into a transaction database. User or purchaser information may be enriched in the relevant databases. Each microservice or module (e.g. calculation microservice module 20 and transaction microservice 30) may act in real time, proceeding when it receives or is notified of events.

Figure 6:
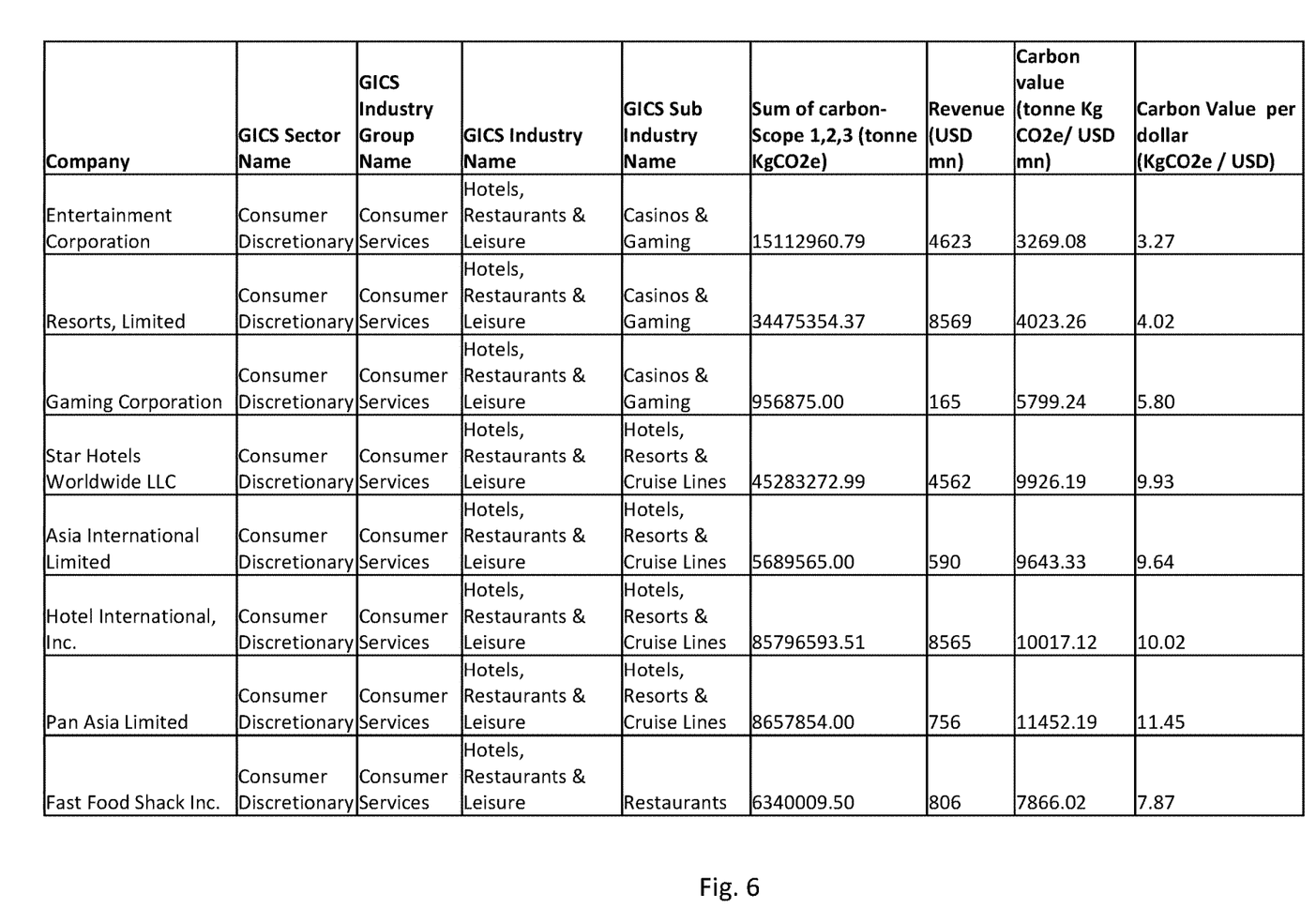
FIG. 6 depicts an example table of carbon emission values correlated to companies with their Global Industry Classification Standard (GICS) classifications, according to embodiments of the present invention.

A carbon value for a merchant may be calculated for example using an existing source assigning carbon data to the merchant. FIG. 6 depicts an example table of carbon emission values correlated to companies with their Global Industry Classification Standard (GICS) classifications, according to embodiments of the present invention. The data in FIG. 6 may be provided by the Trucost service, or another service. Typically, the carbon emissions values received for or assigned to a merchant or company are on a yearly basis (e.g. an annual carbon emission value) but other periods or measures measuring the carbon emissions of a merchant may be used. Example values shown in FIG. 6 include GICS category and subcategory, annual tonnes (metric tonnes) of carbon or carbon equivalent emitted, here the sum of scope 1, 2 and 3, annual revenue in millions of dollars, and carbon or carbon equivalent emitted per dollar of revenue, all typically on an annual basis (other time periods may be used). Each transaction 4 may be automatically categorized based on the merchant into various carbon categorization, e.g. the merchant associated with the transaction may be used to categorize the transaction itself into a carbon category or bucket. For each transaction 4 the following example procedure may be used to calculate the carbon emission value:

Look up the associated merchant in the available information (e.g. S&P company data);

If the merchant (e.g. the merchant or company name) is part of the available information, look at the carbon emission value per dollar of the merchant or company, calculate the carbon emission value per transaction by multiplying the transaction amount by the carbon emission value per dollar;

Else if the associated merchant is not part of the available information: look up the Merchant Category Code (MCC) code (which may be considered a category code for the transaction) included, given or added to transaction 4, map or associate the MCC code to the respective GICS categories: select the weighted Carbon Emission value for the selected GICS category; and calculate the carbon emission value per transaction by multiplying the transaction amount by the average carbon emission value of merchant category per dollar. For example, the carbon emissions impact data for an "unknown" merchant associated with a transaction may be calculated by mapping or associating the transaction category code (e.g. MCC or another code) associated with or describing the transaction to an industry classification associated with the transaction category (e.g. a GICS category), determining carbon emissions impact data for an average company associated for that merchant category code. That value may be assigned to the unknown merchant for future use.

Carbon emissions for a transaction may be calculated based on for example:

1) Total annual carbon emissions for the merchant, e.g., based on standards put forth by the Greenhouse Gas Protocol, which may be gathered from various sources, e.g. from the S&P Trucost data or another service or rating system and using for example scope 1, scope 2 and scope 3 data;

2) Total annual revenue data of the merchant; and

3) Cost for the specific transaction in question.

A carbon emission for a transaction may be derived or calculated by, for example multiplying the currency amount (e.g. dollar or Euro value, or value of another currency the same as the currency used for the divisor) for or associated with the transaction by a carbon emission impact data or value (typically an annual carbon emission value) assigned to or associated with the merchant divided by the annual revenue for the merchant; alternately the divisor may be for a period of time other than annually, typically a period of time corresponding with that of the carbon emissions. Alternately the financial amount may be an amount other than revenue.

The carbon emissions impact data may be the sum of, or another value based on, the Scope 1, Scope 2 and Scope 3 values discussed elsewhere herein, or may be other carbon emissions values. Sample formula Eq. 1 below may be used to calculate the carbon emission value for a specific transaction:

$$\text{Carbon emission value} = \text{Dollar value of transaction} \times \frac{\text{Sum of scope 1, 2 and 3 of carbon emission}}{\text{Annual revenue data}} \quad \text{Eq. 1}$$

Total annual carbon emissions for a merchant may be or factor in the scope 1 scope 2 and scope 3 categories of information within the GHG (Greenhouse Gas Protocol). Scope 1, or Direct GHG emissions, may include all direct GHG emissions by a company, or under direct control of a company, such as fuel combustion directly caused by the company (e.g. at a factory manufacturing a t-shirt), company vehicles and fugitive emissions. Scope 2, electricity indirect GHG emissions, may cover indirect GHG emissions from consumption of purchased electricity, heat or steam. Scope 3, all other indirect emissions from activities of the organization, may occur from sources that the organization does not own or control, such as business travel, procurement, waste and water, or from purchased commodities (e.g. source materials such as beef or cotton).

For each merchant scope 1, 2 and 3 values (in units of for example weight or mass of CO2 or equivalent per time period, e.g. metric tonnes CO2 per year) may be received from a public or subscription service (e.g. the S&P service). In such a scheme, companies may self-report scope 1, 2 and 3 values on a certain basis, e.g. annual basis, and emissions for a specific customer transaction may be derived by these values in conjunction with the company annual revenue and the amount of the transaction: such a calculation may ignore the specific type of good or service sold by the company, although other embodiments may take this into account. In one embodiment, the scope 1, 2 and 3 values may be summed and input into a formula: in another embodiment the different values may be factored into a formula in a different manner.

If carbon information for a specific "unknown" company is not available via a public or subscription service (e.g. the S&P service), such information may he derived or inferred for the company. One embodiment takes known carbon information from a public or subscription service (e.g. the S&P service), creates a carbon value for each category or subcategory of company within the service, assigns the unknown company to a category, and assigns that company the carbon information for the category. Assignment of an unknown company to a category may be done beforehand, e.g. by a person, or may be done by assigning a transaction to a category based on the good or service in the transaction (e.g. based on an MCC code in the transaction associated with the merchant) and then assigning the merchant associated with the transaction to the category the transaction is assigned to. For example, for a merchant unknown to a database including carbon emissions data, the MCC code for a transaction associated with that merchant may be mapped to the GICS codes (e.g. category and subcategory, or sector, industry and sub-industry). The mapped-to GICS codes may be used to look up all companies or merchants ("known" companies or merchants) for which carbon data is known for those mapped-to GICS codes, an average or weighted average of carbon emissions for those known merchants may be calculated, and from this the carbon emissions for the unknown company (or the transaction associated with that unknown company) may be calculated (possibly divided into or broken out by categories such as scope 1, 2 and 3 discussed elsewhere).

Within sources for GHG information, e.g. the S&P source, companies may be categorized into different categories based on their product, and further divided into sub-industries following, for example the Global Industry Classification Standard (GICS) where they are categorized into 11 sectors, 24 industry groups, 69 industries and 158 sub-industries. Thus unknown companies or transactions associated with unknown companies may be assigned to one of these groups, sectors, categories or sub-industries. In one specific example, for each of the 69 industries and 158 sub industries, the weighted average of carbon value may be calculated for an industry/sub-industry pair and applied to a specific unknown company having an analogous industry/sub-industry pair or associated with a transaction having a category mapped to the industry/sub-industry pair.

One embodiment may when determining carbon emissions for a category of company, instead of finding the normal average of the carbon emission of all the companies in a category, give more importance or weighing to companies with higher revenue (or another measure of size), such that their data is be considered more in finding the average. For example, in a carbon emission average in fast food category, more weight may be given the large chain Burger King than a small fast food company. The following Eq. 2 may be used to create a weighted average for a certain company category, industry, or sector taking as inputs revenues and carbon emission values for merchants or companies for that particular category, industry or sector. In the following formula, yearly revenue of the company, x may be the sum of carbon emission values of that company:

$$\text{Weighted Carbon value per Dollar} = (w\_1 * x\_1 + w\_2 * x\_2 + \ldots + w\_n * x\_n)/(w\_1 + w\_2 + \ldots + w\_n) \qquad \text{Eq. 2}$$

Where w=yearly revenue for a merchant or company (w indexed from 1 to n), revenue being used as a weight; w being multiplied by x=Carbon emission value (sum of scope 1, 2 and 3) for company x, and each w and x are multiplied by each other. Weighted Carbon value per Dollar is the carbon value for a category, industry or sector. A specific weighted carbon value per dollar may be calculated for, for example, all companies within a specific category or industry or subcategory or industry. For example, within the "Hotels, Restaurants & Leisure" industry or category, the average company within the subcategory Casinos & Gaming may have a 6.53 carbon value per dollar (e.g. carbon emissions measured in weight per period, such as tonnes carbon per year per dollar of revenue) and the average company within the subcategory Hotels, Resorts & Cruise Lines may have a 10.26 carbon value per dollar. After this is calculated, a new company or merchant or transaction for which carbon emissions values cannot be determined (e.g. via a database) may be assigned to a category, industry or sector (e.g. to a GICS Sub Industry Name), and have its carbon emissions value be the carbon emissions value for that category, industry or sector, calculated per Eq. 2.

For example, if customer A purchased a plant-based hamburger from merchant B which is known to a system or database which provides carbon footprint values, the resulting transaction may have associated with it or be populated with a standard code, such as the MCC code. Data for the sample transaction may include: merchant name, A, MCC code 5814, MCC name (a textual translation of the MCC code) fast food, and transaction value $12.00. Since merchant B is known to a system or database which provides carbon footprint values, the system or database when input with merchant B provides the summed carbon intensity of this (e.g. 44.70996 Kg carbon per dollar per year, which may be a sum of scope 1, 2 and 3 emissions, or another suitable measure), and the carbon emission may be calculated as 12.00×5.82=69.84 KgCO2.

In the case that merchant A is not known to a system or database which provides carbon footprint values, a process may produce a mapping or look for the closest match from the MCC code associated with the transaction associated with the merchant to another code, such as a GICS code or sub-category or sub-industry (in this example Industry—"Hotels, Restaurants & Leisure, Sub-Industry"—"Fast Food Restaurants"). A process may calculate or use the already calculated carbon emission for the sub-industry (e.g. 5.7 Kg CO2/dollar) based on this, calculate the carbon emissions for a transaction having a $9.00 value, $9.00×5.7=51.3 KgCO2.

In the case that merchant A is not known to a system or database which provides carbon footprint values, calculated carbon values for an unknown merchant may be saved for that merchant, for example in merchant database 27.

Figure 2:
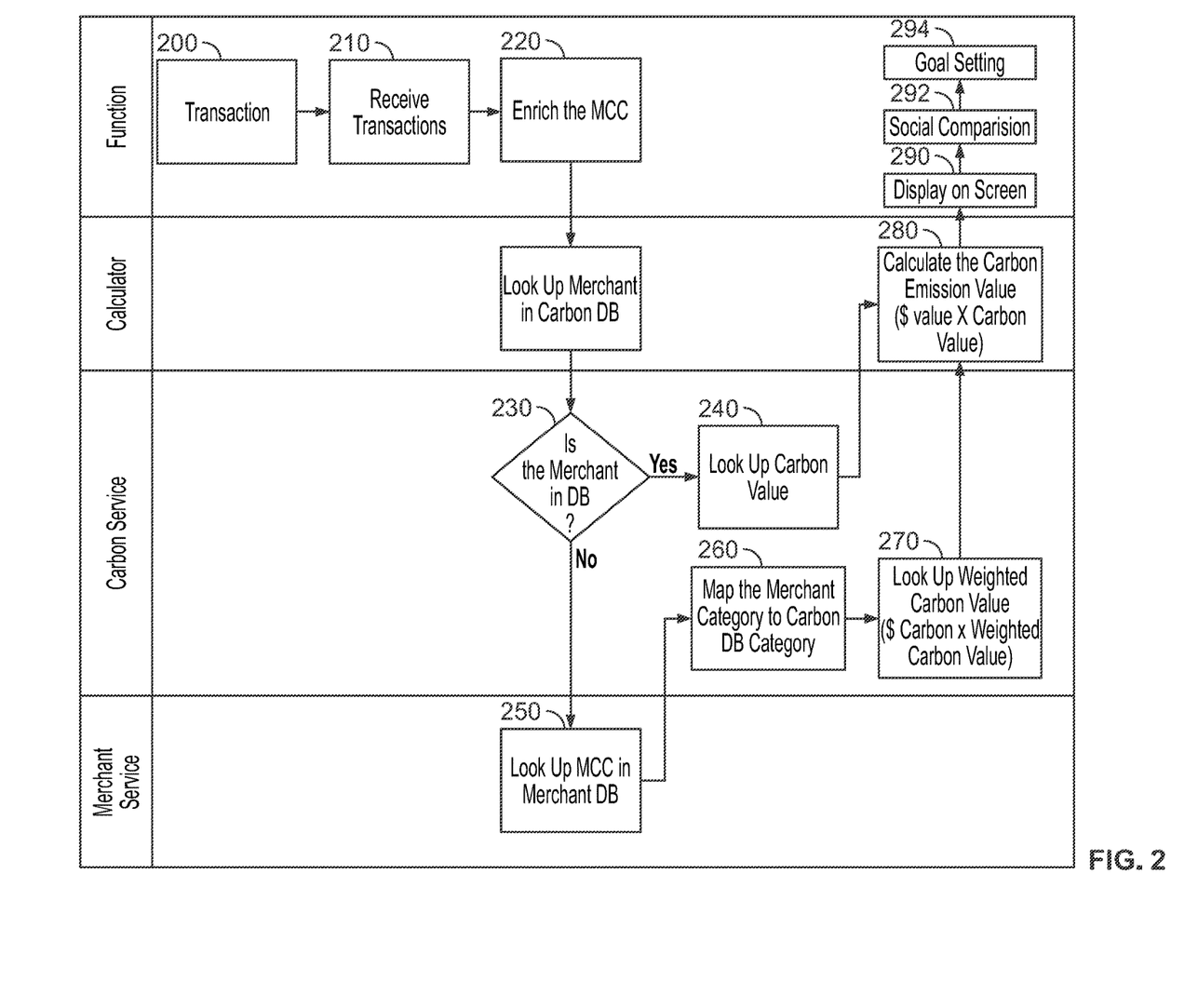
FIG. 2 shows a flowchart of a method according to embodiments of the present invention.

FIG. 2 shows a flowchart of a method according to embodiments of the present invention. The operations of FIG. 2 may be performed by the systems shown in FIG. 1, FIG. 3, and FIG. 7, but other systems may be used.

Referring to FIG. 2, in operation 200, a transaction may take place. E.g. a user may purchase an item or service from a merchant, using an electronic payment method such as credit card, debit card, automatic money transfer, or other method.

In operation 210, a computer system may receive from a transaction data source (e.g. a computer system operated by a bank or clearing organization handling the transaction) a transaction data item describing the transaction, each transaction associated with the user, the merchant, and a transaction currency amount (e.g. $10, 5 Euros, etc.). The computer system may receive from a plurality of transaction data sources a number of data items describing transactions.

In operation 220, the transaction may be enriched or have data added to it, such as carbon emissions data relevant to the merchant, or data which can be used to determine carbon emissions data for the merchant. While an MCC code is typically included with a transaction received from a provider, an MCC, and/or category and/or subcategory for the merchant may be added during enrichment.

For each transaction a system may receive carbon emissions impact data for the merchant associated with the transaction. For example, in operation 230, it may be determined if the merchant is in a database of known merchants (e.g. the S&P Trucost database), and if it is, in operation 240, the carbon value for the merchant may be accessed or looked up, and the process may continue to operation 280.

If the merchant is not in the database of known merchants, in operation 250, the merchant or the transaction associated with the merchant may be mapped or associated, e.g. using an MCC or other code to a GICS or other category (possibly with sub-categories) which may be used to select a weighted Carbon Emission value for the selected GICS category. For example, the MCC or other code may be looked up in a merchant database, and in operation 260, the MCC or other code may be mapped to a carbon database or GICS category and/or subcategory, and in operation 270, the weighed carbon value (e.g. having been computed using Eq. 2, or another suitable method) may be retrieved based in part on the carbon database category.

In operation 280, the carbon emissions value may be calculated or derived. For example, an embodiment may derive from the currency amount associated with the transaction and the carbon emissions impact data for the merchant associated with the transaction, or associated with the transaction. a carbon emission value associated with the transaction. Emissions caused by each transaction may be calculated for example by multiplying the transaction amount by carbon emissions impact data associated with the merchant associated with the transaction and dividing by the annual revenue for the merchant.

In operation 290, carbon emission values for the transaction may be displayed to the user or purchaser.

In operation 292, a social comparison may be displayed to a user. A carbon emissions value related to multiple transactions associated with the user may be displayed and compared to carbon emissions values related to multiple transactions associated with other users sharing a characteristic (e.g. age, location, income, etc.) with the user.

In operation 294 goal setting may take place. A user goal may be received from a user defining a percentage of a user's carbon emissions value associated with multiple transactions. A carbon emissions value left to spend for transactions for a period of time may be displayed to the user.

Other or different operations may be performed.

An embodiment may be integrated into a user's client online banking or credit card payment system or GUI, e.g. into a banking channel where their banking activity is available. The user may be provided with not just their financial information as is known but also carbon spend as discussed herein, e.g. total carbon footprint across all their financial activities such as credit, debit card transaction, all displayed in one place.

Figure 4:
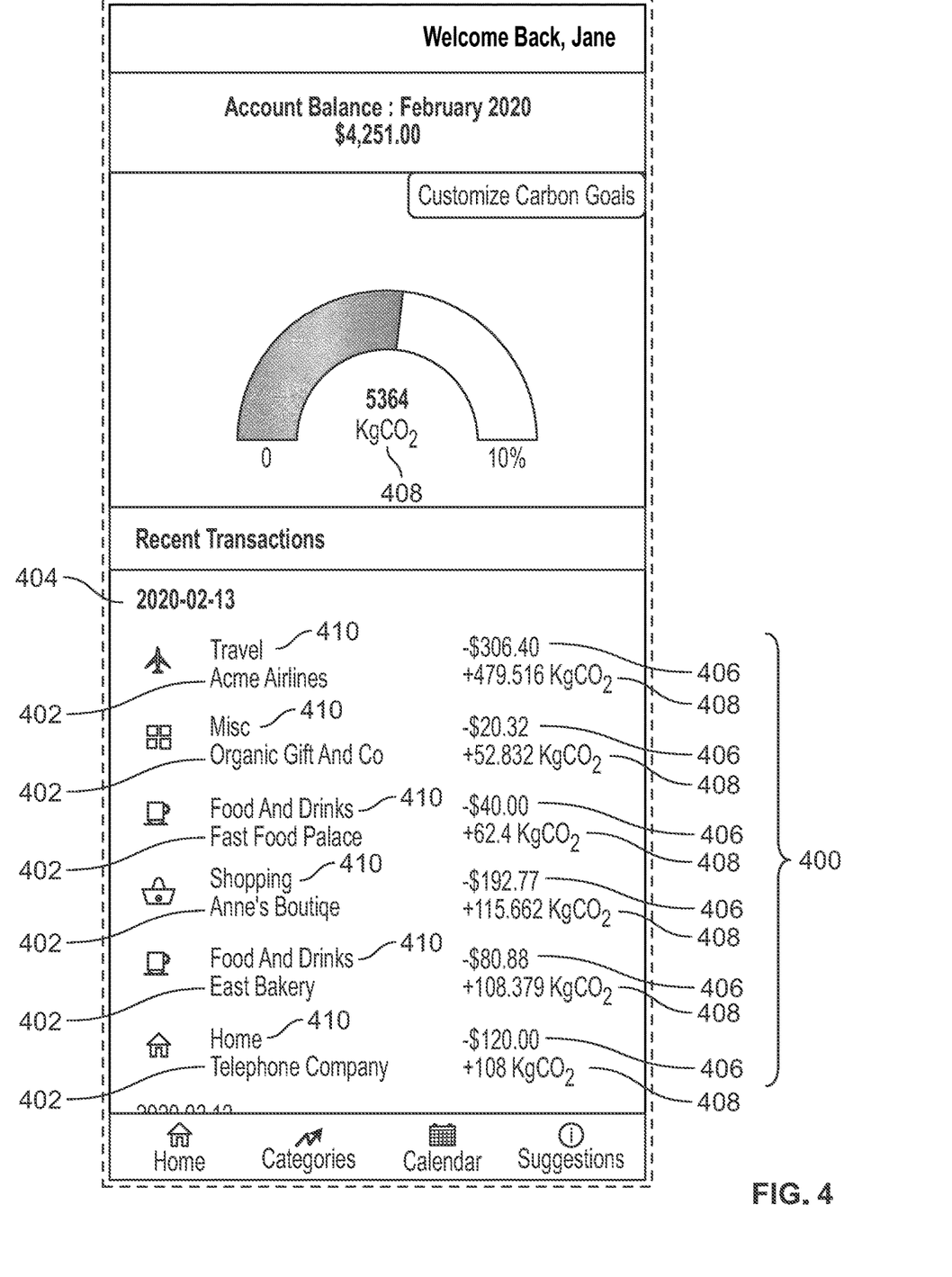
FIG. 4 depicts a sample user display showing a set of transactions with associated carbon costs, according to embodiments of the present invention.

FIG. 4 depicts a sample user display showing a set of transactions with associated carbon costs, according to embodiments of the present invention. FIG. 4 describes a user's carbon footprint per each of a set of transactions 400, each including a merchant name 402; a transaction date 404; a transaction amount (e.g. the amount the consumer spent for the good or service, shown here as a negative dollar amount) 406; a carbon spend amount 408, which can be expressed for example as a weight of carbon estimated to be emitted into the atmosphere by the good or service involved in the transaction, and/or the carbon offset true value, or by other methods; and a category or description of the service 410. In one embodiment, a display may include for each transaction a Merchant Category icon or display (e.g. in text); a merchant category name; a merchant name; a transaction dollar amount; a transaction carbon footprint amount; and an associated carbon dollar value.

The carbon offset true value may equal the weight of carbon emission value calculated times the social carbon value or social cost of a unit of carbon emissions set by EPA, possibly expressed as a per metric ton value. Other monetary offset values may be used. A monetary offset value such as the offset true value of social cost of carbon (SC-CO2) may be used to value the climate impacts of activities. SC-CO2 may be a measure, in currency such as dollars, of the long-term damage done by a ton of carbon dioxide (CO2) emissions in a given year. This dollar figure can also represent the value of damages avoided for a small emission reduction (e.g., the benefit of a CO2 reduction). For example, per https://19january2017snapshot.epa.gov/climatechange/social-cost-carbon_.html, the carbon offset value in 2020 for the emission of a metric ton of carbon dioxide is $123.00 in the U.S. A user may be presented with information such as the details of a specific transaction (e.g. cost, date, item, etc. related to a t-shirt purchase), the carbon emissions value for that product (e.g. 230 KgCO2 for the t-shirt), and a carbon offset true value (e.g. $6 for the t-shirt) which may be the social cost of carbon, the value to offset the carbon emitted.

Figure 3:
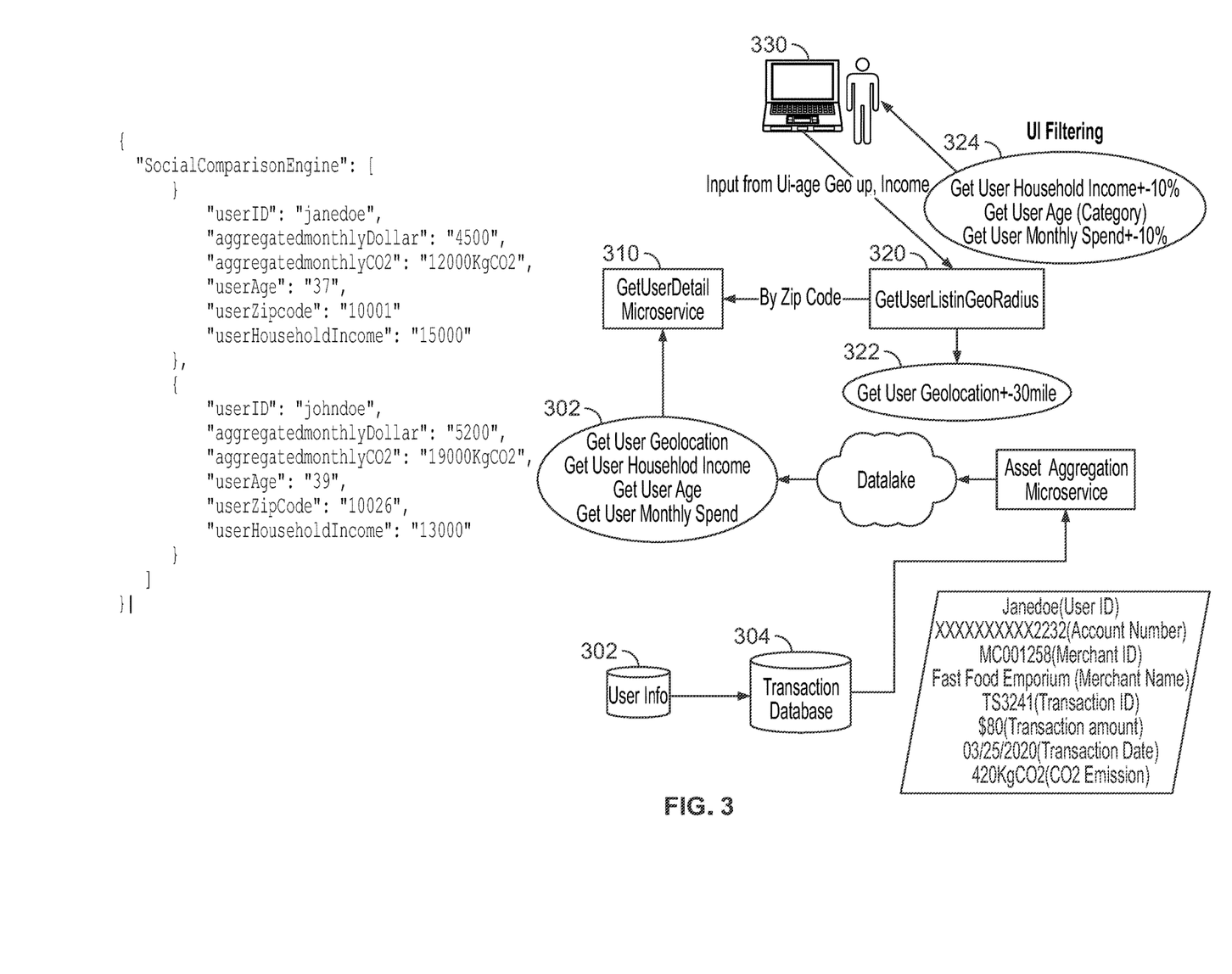
FIG. 3 depicts a social comparison system according to embodiments of the present invention.

FIG. 3 depicts a social comparison system according to embodiments of the present invention. The components and data flows shown in FIG. 3 may be used with a carbon tracking system such as shown in FIG. 1 and may be embodied or carried out by a computing system as shown in FIG. 7, but other hardware or systems may be used. In some embodiments, a social comparison engine or display may allow users or customers to compare their carbon output from purchases to that of other users or consumers. A user may view or have displayed to the user a carbon emissions value related to multiple transactions associated with the user (e.g. a carbon spend for the user over a period of time such as a month, and/or per category) and a carbon emissions value related to others or peers: e.g. a carbon spend based on multiple transactions associated with other users sharing a characteristic or multiple characteristics (e.g. a demographic characteristic, living in the same area, age, postal code, income, etc.) with the user. A social comparison display may include a map, with a user's current location (e.g. using geo location methods, or a user's input location, or user records) with for example a highlighted geographical radius. Based on user inputs or a filter the user selected the display may show the average of the carbon spend for example in each category.

Using such a peer comparison embodiment, users may compare carbon information to others based on, or filtering others by, different categories, such as age, residence, household income, or monthly spending level (e.g. monthly dollar value spend). An embodiment may receive (e.g. from a user) or otherwise determine or track the geographic or map location of a user and compare that user with other users in the same geographical location, and possibly in addition the same average income or spend within this geographic area. Such an embodiment may use or input the user population (e.g. number of similar users) in the target user's geographical location (e.g., city, state, postal code etc.), then find people similar to the user by one or more of household income, monthly spend, age group etc. (possibly within a defined threshold (e.g., +−10%), and then determine and provide to the user the average carbon spend or footprint per period (e.g. month) for people like the user. The average carbon spend per period for people like the user may be based on (e.g. the average of) multiple transactions associated with other users (typically users sharing a characteristic with the user).

A user may compare their carbon output from spending to others within, for example, the same zip or postal code as the customer, within an e.g. a certain number of miles or other another radius of the user, or another geographical measure. The comparison may be for example to an average carbon emission a certain filtered category of others (e.g. within a geographical area, consumers having a certain income range, etc.). Other filters may create groups of people for a user to compare their carbon output to such as number of people in household, income, spending habit, whether or not the household has pets, age or age range, etc. A filter may operate with a percentage range: e.g. +−10% or another percentage such that a user compares their carbon spend to the average of other users within the range of 10% more and 10% less than the income or household income for that user. A system may have the relevant values for the particular customer (e.g. age, address, income) or may prompt the user to enter such information for a comparison to others.

Referring to FIG. 3, user information such as for each customer an address, location or zip code, number of people in household, annual income, monthly spending, and/or other demographic information may be stored in user information database 302, which may be or include information from databases such as user information database 34. Transaction database 304 may be or include information from databases transaction database 32, and may store transaction information. A user detail microservice 310 may obtain information 302' such as the user's location or geolocation, household or other measure of income, age, monthly spending, and/or other information. A user may provide or input the current user location or address, age, household income information, or such information may be determined from a database for example used by the system of FIG. 1.

A get user list microservice 320 may gather a set of users within a specific target user's geographical area (e.g. within X miles) and within that target user's demographic information range (e.g. same number of people in household, within a percentage or other range of income, etc.) and provide the information to user detail microservice 310 which may then provide to the target user the average carbon spend information for the set of comparable users identified by geographical radius microservice 320. A get user geolocation microservice 322 may provide to get user list microservice 320 data allowing microservice 320 to produce, from its internal database of users, a list of users within a certain geographic radius of, or within the area of, the target user. For example get user geolocation microservice 322 may be provided by microservice 320 with a geographic identifier, such as an address and a radius (e.g. within 10 miles of 1500 Broadway, New York) and user geolocation microservice 322 may return a geographic area describing the input, such as a set of postal codes corresponding to a 10 mile radius of 1500 Broadway. User geolocation microservice 322 may then produce all users known to it in the returned geographic area possibly also filtered by other demographic information such as income, age, etc.

A get user demographic service 324 may provide to get user list microservice 320 a list of users having the same or similar (e.g. within a range such as +−10% demographic information (e.g. age, income, monthly spend) as the target user; such information may have been provided by users via user terminals 330.

An automatic carbon goal setting engine or process may display information to customers or users to make the user aware of their carbon impact and help or force the user to cut or reduce their carbon spend. Such embodiments may provide carbon planning tools for users who desire to improve their carbon footprint. For example, an embodiment may receive from a user a goal, for example defining a percentage of a user's actual carbon spend over a prior period (e.g. an emissions value associated with multiple transactions such as the consumer's entire carbon spend, or within a category, typically over a past period of time), and periodically, or in conjunction with each user transaction, provide or display to the user carbon emissions value left to spend for transactions for a period of time (e.g. for cumulative transactions over the next month). A goal-based category maybe set based on for example a GICS category, an MCC category, or another category.

An embodiment may set or provide a carbon spend for a user based on that user's spending history, by for example analyzing a previous period of carbon spending for the user (e.g. the last 6 months of the carbon emissions) and may calculate the average per period (e.g. per month) based on this period. A user may then select of input an amount or intensity of goal setting, for example expressed as a percentage. For example, a user may select or input, and a system may receive:

Aggressive—An embodiment may provide a carbon spend goal for the period (e.g.
month) that is 50% of the average historical carbon footprint (e.g. the carbon spend for the particular user) for prior periods;
Average—Provide a goal that is 30% below the average historical carbon footprint for prior periods; or
Lenient—Provide a goal that is 10% below the average historical carbon footprint.

Other goals or intensities may be selected. Users may input or make changes to such goals for example by increasing or decreasing the goal. This can be categorized to be able to set goals for each category or bucket of spending or carbon emissions (e.g. based on category information in category classifications 21 and sub-category classifications 23 applied to specific transactions), or may be for a user's overall carbon spend.

An embodiment may then provide or display progress updates towards the assigned goals, and a balance (e.g. carbon permitted left to spend), for categories or buckets or an overall user spend. For example, based on the goal set, an embodiment may display to the user how much of carbon has been "emitted" for the month and the remaining carbon value that the user can "emit". This can also be viewed for different categories. An embodiment may display savings of carbon emissions, for example, based on specific spending decisions or choices, or based on the goals set and compared to the previous months' carbon spend, displayed in percentage the decrease or increase of the carbon spend for the specific month. Other embodiments may actively prevent user spending if a user is near to or exceeding stated goals, for example by cooperating with financial systems used by the user to make purchases.

An embodiment including a carbon spending power calculator may allow a purchaser or user to set carbon spending restrictions (which may be combined with financial spending restrictions) or caps based on rules including but not limited to a specific purchase, retailer, carbon spend limits, category etc. Relative to these limits, a user can may choose an option to over spend (e.g. violate the limit with a warning) or block (e.g. have the relevant financial system not allow the expenditure) for the relevant limit or goal set. In one embodiment the user may receive an immediate warning when attempting or carrying out the transaction that the user is over or at a certain level relative to (e.g. at 90% of) the relevant carbon spending limit (e.g. for a certain category or overall). In some embodiments, even if the user has reached 100% of the carbon emission goal, the user is not stopped from completing a financial transaction. In other embodiments, a block feature may prevent the user from any financial transaction causing carbon emissions when the user has reached 100% of the carbon emission goal. Various limits may be selected by a user, such as "Overall", where the user sets a carbon limit for a period of time such as a month for overall carbon emissions, and the user may be notified when the user has emitted all or a certain portion (e.g. 90%) of the goal set for the month. Other limits may be set on a per category (e.g. food, dining out, transportation, etc.) or per merchant basis.

Carbon emission values can be calculated and displayed to a user in various ways, and aggregated carbon emission values may be displayed. For example, carbon emission values by user may be displayed. Carbon emission values by household may be displayed, where aggregated transactional data and carbon emission value for everyone in the same household is displayed together. Individuals in a household can share the financial transaction with each other along with carbon emission information. Carbon emissions over a period of time may be displayed, for example over periods such as a week, month, or another time frame.

A display provided to a user may include user friendly screens to allow a user to set carbon goals, track goals and show carbon emission footprint for each banking transaction. Transaction activity screens may provide a user with (e.g. for a period of time such as the last 30 days) a banking transaction dollar value, a carbon spend or emissions value (e.g. KgCO2 or equivalent) per transaction and associated carbon dollar value per transaction. A carbon goal setting screen or GUI may display current average carbon spending for a user, suggested goals, spending history, average carbon spend for similar profile people (including for example suggested goals, spending history, average carbon spend for similar profile people, etc.) and allow a user to input parameters to alter goals or such a display. GUIs or screens may provide categorizations by type of transaction; including allowing user input customization of categories. Transactions may be categorized into various groups based on for example the merchant type of the transaction and may provide an overview of the carbon footprint in each of the transactions.

Figure 5A:
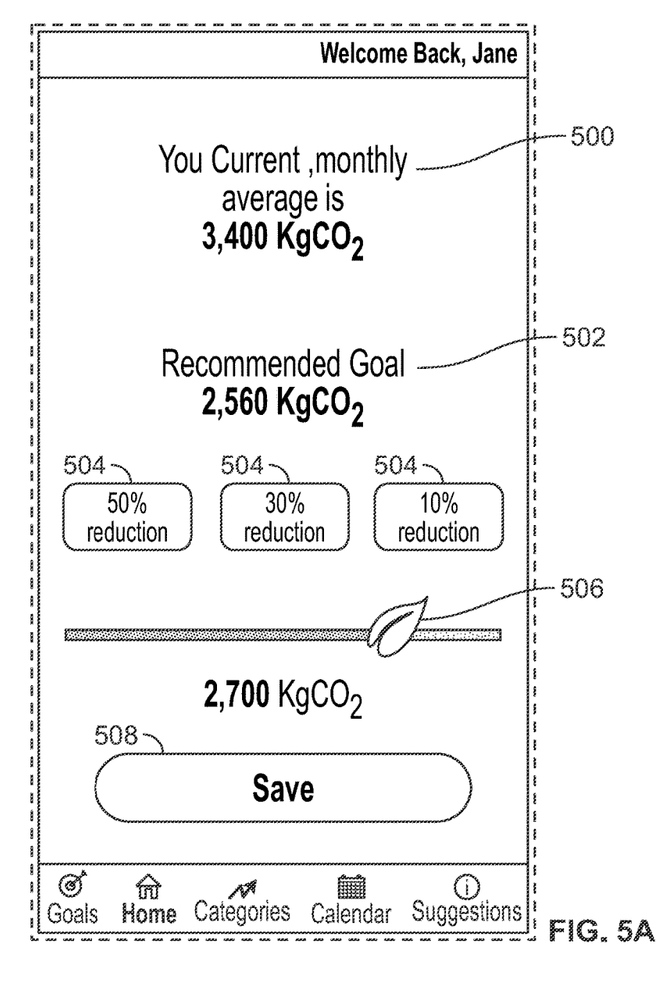
FIGS. 5A and 5B depict a sample user display showing goal setting displays, according to embodiments of the present invention.
Figure 5B:
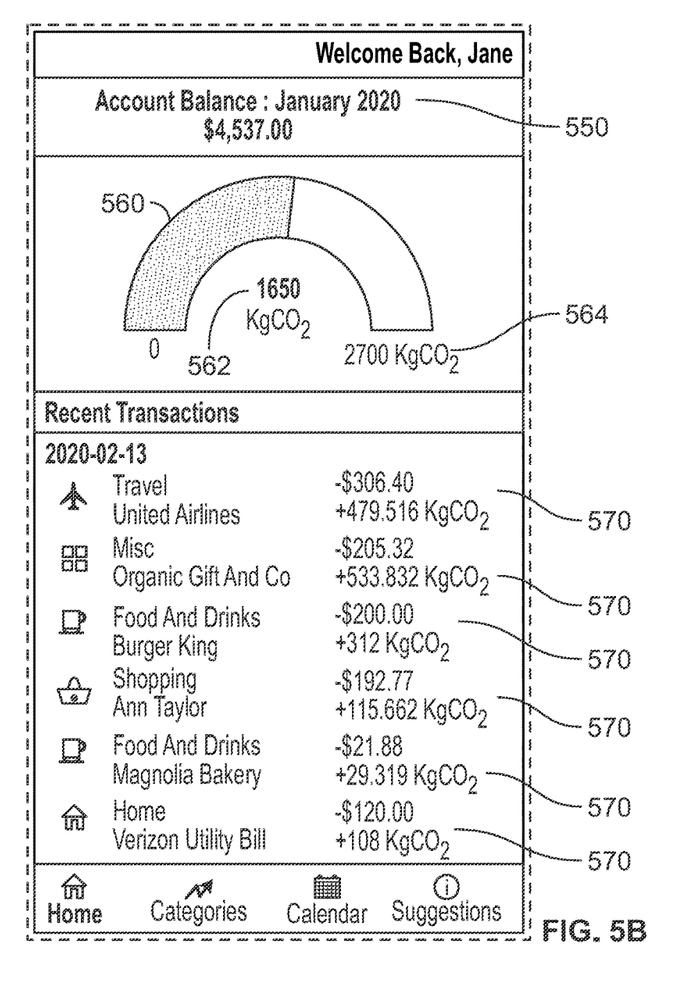

FIGS. 5A and 5B depict a sample user display showing goal setting displays, according to embodiments of the present invention. A carbon goal setting screen or display may allow the user to set carbon goal for a period such as a month. A screen or display may display the monthly average carbon emission value for the user for example calculated by a goal setting engine. Referring to FIG. 5A, a user or customer's current carbon emissions 500 (e.g. calculated as an average over a certain number of past months (e.g. six months), or by another method) may be displayed. A recommended goal 502 (e.g. per period, such as per month) may be displayed. A user may input and a system may receive a user's selected goals, e.g. by a user selecting on a GUI such as FIG. 5A (e.g. using an input device such as a mouse) goal selection icons or buttons 504. Alternately a "slider" selection 506 may be used to select a goal. Selections may be finalized by the use of a "save" icon or button 508.

Referring to FIG. 5B, a user's financial information such as account balance 550 may be displayed along with a carbon budget for a period of time 560, the carbon budget including a total allowed or goal carbon amount 562 and a carbon amount spent or emitted so far for the user for the period of time. The budget, goal and amount spent may be for a period of time (e.g. a month). A set of recent transactions 570 may be displayed, along with merchant, purchase category, currency amount, and carbon spend or emissions amount for each transaction.

Reference is made to FIG. 7, showing a high-level block diagram of an exemplary computing device according to some embodiments of the present invention. Computing device 100 may include a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention. Various components, computers, and modules of FIGS. 1 and 3 may be or include devices such as computing device 100, and one or more devices such as computing device 100 may carry out functions such as those described in FIG. 2. For example, calculation microservice module 20 and data communications platform 10 may be implemented by a computing device 100.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may configure controller 105 to calculate and display carbon footprint data and perform other methods as described herein. Although, for the sake of clarity, a single item of executable code 125 is shown in FIG. 7, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as carbon spend data, user data, merchant data and financial transactions may be stored in storage system 130 and may be loaded from storage system 130 into memory 120 where it may be processed by controller 105. Some of the components shown in FIG. 7 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or"

rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for determining the carbon emissions impact for a specific user's transactions, the method comprising:
receiving at a computer system from a plurality of computerized transaction data sources data items, each data item describing a transaction, each transaction associated with the user, a merchant, and a currency amount;
the computer system comprising a plurality of databases and a communications platform allowing a plurality of microservices to communicate by placing events on the communications platform, events triggering microservices to process the messages, for each transaction, receiving at the computer system carbon emissions impact data for the merchant associated with the transaction;
deriving at the computer system, using a microservice reacting in real time to received data in the form of events comprising a transaction amount, a transaction date, and a merchant identifier, and passed by the communications platform, from the currency amount associated with the transaction and the carbon emissions impact data for the merchant associated with the transaction, a carbon emission value associated with the transaction and placing an event comprising an enriched transaction on the communications platform, the enriched transaction comprising data describing the transaction and the carbon emissions value associated with the transaction, wherein deriving a carbon emission value associated with the transaction comprises multiplying the currency amount associated with the transaction and the carbon emissions impact data for the merchant associated with the transaction and dividing by the annual revenue for the merchant, wherein for at least one transaction the computer system calculates carbon emissions impact data for the merchant associated with the transaction by mapping a transaction category code associated with the transaction to an industry classification, and determining carbon emissions impact data for an average company associated for that industry classification;
receiving the data describing the transaction and the carbon emissions value by a store transaction microservice reacting in real time to the event saving the data by the store transaction microservice to a transaction database and placing an acknowledged event onto the data communications platform signaling that the transaction is stored in the transaction database, and placing a carbon calculation event comprising a customer identification, transaction identification and carbon emission amount on the communications platform; and
by reacting in real time to a received event, calculating using a microservice and displaying to a user a carbon emissions value related to multiple transactions associated with the user and a carbon emissions value related to multiple transactions associated with other users sharing one or more characteristics with the user, the one or more characteristics selected from the group consisting of income, age, monthly spending level and user address.

2. The method of claim 1, wherein each data item comprises a transaction amount and a merchant identifier.

3. The method of claim 1, comprising displaying to a user the carbon emissions value.

4. The method of claim 1, comprising receiving from a user a goal defining a percentage of a user's carbon emissions value associated with multiple transactions and displaying to the user a carbon emissions value left to spend for transactions for a period of time.

5. A system for determining the carbon emissions impact for a specific user's transactions, the system comprising:
a memory;
a plurality of databases;
a communications platform allowing a plurality of microservices to communicate by placing events on the communications platform, events triggering microservices to process the messages;
and;
a processor configured to:
receive from a plurality of computerized transaction data sources data items, each data item describing a transaction, each transaction associated with the user, a merchant, and a currency amount;
for each transaction receive carbon emissions impact data for the merchant associated with the transaction;
derive, using a microservice executed by the processor reacting in real time to received data in the form of events comprising a transaction amount, a transaction date, and a merchant identifier, and passed by the communications platform, from the currency amount associated with the transaction and the carbon emissions impact data for the merchant associated with the transaction a carbon emission value associated with the transaction and place an event comprising an enriched transaction on the communications platform, the enriched transaction comprising data describing the transaction and the carbon emissions value associated with the transaction, wherein deriving a carbon emission value associated with the transaction comprises multiplying the currency amount associated with the transaction and the carbon emissions impact data for the merchant associated with the transaction and dividing by the annual revenue for the merchant, wherein for at least one transaction the computer system calculates carbon emissions impact data for the merchant associated with the transaction by mapping a transaction category code associated with the transaction to an industry classification, and determining carbon emissions impact data for an average company associated for that industry classification;
receive the data describing the transaction and the carbon emissions value by a store transaction microservice, executed by the processor and reacting in real time to the event, save the data by the store transaction microservice to a transaction database and place an acknowledged event onto the data communications platform signaling that the transaction is stored in the transaction database, and place a carbon calculation event comprising a customer identification, transaction identification and carbon emission amount on the communications platform; and by reacting in real time to a received event, calculate using a microservice executed by the processor and display to a user a carbon emissions value related to multiple transactions associated with the user and a carbon emissions value related to multiple transactions associated with other users sharing one or more characteristics with the user, the one or more characteristics selected from the group consisting of income, age, monthly spending level and user address.

6. The system of claim 5, wherein each data item comprises a transaction amount and a merchant identifier.

7. The system of claim 5, wherein the system is configured to display to a user the carbon emissions value.

8. The system of claim 5, wherein the system is configured to receive from a user a goal defining a percentage of a user's carbon emissions value associated with multiple transactions and display to the user a carbon emissions value left to spend for transactions for a period of time.

9. A method for determining carbon emissions caused by transactions, the method comprising:

receiving at a computer system from a plurality of computer systems a plurality of transaction data items each associated with a user, a merchant, and a transaction amount;

the computer system comprising a plurality of databases and a communications platform allowing a plurality of microservices to communicate by placing events on the communications platform, events triggering microservices to process the messages, calculating at the computer system, using a microservice reacting in real time to received data in the form of events comprising a transaction amount, a transaction date, and a merchant identifier, and passed by the communications platform, carbon emissions caused by each transaction by multiplying the transaction amount by carbon emissions data associated with the merchant associated with the transaction and dividing by the annual revenue for the merchant and placing an event comprising an enriched transaction on the communications platform, the enriched transaction comprising data describing the transaction and the carbon emissions value associated with the transaction, wherein for at least one transaction the computer system calculates carbon emissions impact data associated with the merchant associated with the transaction by mapping a transaction category code associated with the transaction to an industry classification, and determining carbon emissions impact data for an average company associated for that industry classification;

receiving for a transaction the data describing the transaction and the carbon emissions caused by the transaction by a store transaction microservice reacting in real time to the event, saving the data by the store transaction microservice to a transaction database and placing an acknowledged event onto the data communications platform signaling that the transaction is stored in the transaction database, and placing a carbon calculation event comprising a customer identification, transaction identification and carbon emission amount on the communications platform; and receiving from a user a goal defining a percentage of a user's carbon emissions value associated with multiple transactions and displaying to the user a carbon emissions value left to spend for transactions for a period of time.

10. The method of claim 9, wherein each transaction data item comprises a merchant identifier.

11. The method of claim 9, comprising displaying to a user the calculated carbon emissions.

12. The method of claim 9, comprising displaying to a user calculated carbon emissions related to multiple transaction data items associated with the user and calculated carbon emissions related to multiple transaction data items associated with other users sharing a characteristic with the user.

* * * * *